United States Patent
Takemura et al.

[11] 3,911,348
[45] Oct. 7, 1975

[54] ELECTRIC CHARGE HOLDING DEVICE

[75] Inventors: Takehide Takemura, Hirakata; Shunji Minami, Moriguchi, both of Japan

[73] Assignee: Matsushita Electric Industrial Co., Ltd., Osaka, Japan

[22] Filed: Feb. 20, 1974

[21] Appl. No.: 443,998

[30] Foreign Application Priority Data
Feb. 20, 1973 Japan .............................. 48-22300
Feb. 20, 1973 Japan .............................. 48-22301
Feb. 20, 1973 Japan .............................. 48-22302

[52] U.S. Cl. ................................................. 320/1
[51] Int. Cl.² ......................................... H02J 15/00
[58] Field of Search ................. 321/1; 340/173 CA; 307/109

[56] References Cited
UNITED STATES PATENTS
2,532,338  12/1950  Schlesinger .......................... 320/1
2,942,169  6/1960  Kalfaian ................................ 320/1
3,209,229  9/1965  Cox ....................................... 320/1

*Primary Examiner*—Stuart N. Hecker
*Attorney, Agent, or Firm*—Stevens, Davis, Miller & Mosher

[57] ABSTRACT

This invention relates to an electric charge holding device consisting of a series circuit of a capacitor, a discharge tube and a resistor, where an arbitrary variable voltage and an a.c. voltage which are respectively lower and higher than the discharge voltage of the discharge tube are superimposed and an output voltage is taken out of the capacitor, aiming to provide an electric charge holding device for effecting an accurate hold of electric charge.

7 Claims, 9 Drawing Figures

ELECTRIC CHARGE HOLDING DEVICE

This invention relates to an electric charge holding device which is arranged to accurately hold an electric charge.

An electric charge holding device is known which combines an insulated gate type field effect transistor (FET) and a capacitor, wherein a voltage stored or conserved in the capacitor is detected by the gate of the transistor and an output corresponding to the voltage is taken from the source or the drain of the transistor. A closed circuit consisting of a capacitor, a neon discharge tube, a resistor, a switch and an electric power source have been used for charging and discharging the capacitor. Problems and demerits inherent in this circuit have resulted from the necessity of controlling the voltage of the electric power source within the operational range of the transistor, the necessity of controlling the characteristics of the power source and discharge tube (i.e. fluctuations and variations therein), the necessity of setting the voltage of the power source relatively high (which is disadvantageous if the circuit is to be transistorized), and the inconvenience of adjusting the charging speed.

This invention is intended to remove the above defects and to provide an electric charge holding device consisting of a series circuit of a capacitor, a discharge tube and a resistor, in which an arbitary voltage having a d.c. component and an a.c. voltage which are respectively not higher than and not lower than the discharge voltage of the discharge tube are superimposed, and an output voltage is taken from across the capacitor.

With the electric charge holding device of this invention, it is not necessary to consider variations in the discharge voltage of the discharge tube. No change occurs in the charging speed of the capacitor so that reliability is promoted. Further, a voltage which is variable with time may be used as the charging voltage. The charge and discharge characteristics are determined by the ratio D of the pulse width to the period, when a square wave voltage is used, and are hardly influenced by variations in the a.c. voltage and the discharge voltage of the discharge tube thereby improving the reliability further. Moreover, turning the charge and discharge circuit on and off can be effected by the ON – OFF operation of the a.c. power source. Such a.c. voltages can be generated by transistor oscillators, and small transformer may be used. Thus, this invention is suited to transistorized devices. The capacitor is not charged so as to provide an excessive voltage and therefore the control of the output variation range of FET can be easily accomplished.

Explanation of this invention will be made in detail with reference to the drawings, in which.

Figure 1:
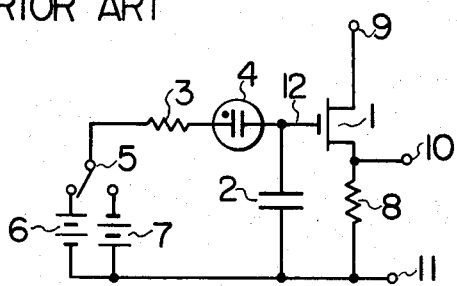
FIG. 1 is an electric circuit diagram of a prior art electric charge holding device.

FIG. 1 shows a charge - discharge circuit for a capacitor in the above-mentioned prior art electric charge holding device in which the reference numeral 1 designates an insulated gate type FET, 2 is a capacitor connected to the gate of transistor 1, 3 and 4 are respectively a resistor and a discharge tube such as a neon discharge tube connected in series with the gate of transistor 1, 5 is a switch for applying voltages from a positive voltage source 6 and a negative voltage source 7 to the capacitor 2 through the resistor 3 and the discharge tube 4, 8 is a source resistor connected to the source of transistor 1, 9 is a drain terminal for applying a suitable positive voltage to the drain of transistor 1, and 10 and 11 are output terminals for taking out an output voltage accross the source resistor 8.

As described in detail later, the positive voltage source and the negative voltage source have a sufficiently accurate absolute value not lower than the discharge voltage of discharge tube 4. The discharge tube 4 stops discharging, when the switch 5 is in the neutral state, thereby preventing a leakage of electric charge from the capacitor 2 to the switch 5. Further, the resistance between the gate and the source of FET 1 is large because it is of the insulated gate type. The leakage of electric charge from the capacitor 2 to the transistor 1 is, therefore, extremely small.

Next, the operation of the above circuit will be explained. We assume that the voltage of positive voltage source 6 is $+E_6$, that of the negative voltage source 7 is $-E_7$ and the discharge voltage of discharge tube 4 is $V_{NE}$. Now, consider that the voltage at the capacitor 2 is zero. When the switch 5 is connected to the positive voltage source 6, the discharge tube 4 discharges if $+E_6 > V_{NE}$, charging the capacitor 2. The voltage increases exponentially, as shown by the dotted curve in FIG. 2. The time constant of charging is determined by the product of the values of resistor 3 and capacitor 2, and the voltage approaches $(+E_6 - V_{NE})$.

At a time $t_1$, if the switch 5 is moved to the neutral state, charging stops and the voltage at this time is maintained, as shown by the thin solid line. Next, at a time $t_2$, when the switch 5 is connected to the negative voltage source 7, the voltage decreases exponentially as shown by the chain curve. Thereafter, at a time $t_3$, if the switch 5 is moved again to the neutral state, the voltage at this time is maintained, as shown by the thick solid line. An output voltage corresponding to the voltage charged in the capacitor 2 can be obtained across the output terminals 10 and 11. Thus, these terminals 10 and 11 provide a voltage maintained at an arbitrary value.

Here, care should be taken to control the voltage $(+E_6) - V_{NE}$ and the voltage $(-E_7) + V_{NE}$ within the operational range of FET 1. Otherwise, an excess of charge or discharge occurs, retarding the next operation. Further, variations in $+E_6$, $-E_7$, and $V_{NE}$ influence the charging characteristic. The discharge voltage $V_{NE}$ has variations depending on the discharge tube 4. The relatively high values of $+E_6$ and $-E_7$ (for example $+E_6 = 80 \sim 110$ volts, $-E_7 = -70 \sim -100$ volts) and their opposite polarities make transistorization more difficult. The stabilization of these voltages is also necessary.

Moreover, when the charging is done by a variable voltage, the polarity of the discharge voltage $V_{NE}$ of discharge tube 4 and the charging voltage should be carefully selected.

Figure 2:
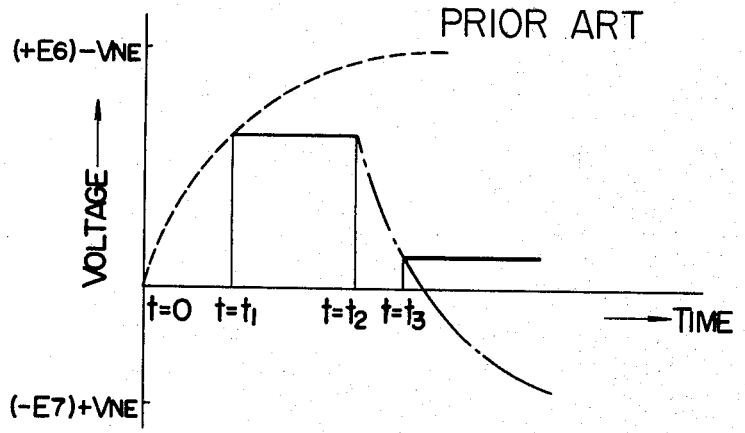
FIG. 2 is a diagram showing the charge and discharge characteristics of the above device.

When the output obtained above is used, for example, as a control voltage of an electronic circuit such as a volume control, the application of either a positive or a negative voltage for a definite period is necessary in order to obtain a desired control voltage, as easily understood from FIG. 2. Namely, since the charging time constant is determined by the resistor 3 and the capacitor 2, the charging speed is uncontrollable. Although an explanation has been made of a case in which an output voltage is obtained from the source side of an insulated gate type FET 3, needless to say the output voltage may be obtained from the drain side.

This invention is intended to remove the abovementioned defects inherent in the prior art. Explanation will be made of an embodiment of this invention with reference to FIG. 3, in which 13 is a resistor, 14 is a discharge tube such as a neon discharge tube, 15 is a capacitor, 16 is a d.c. voltage source or an arbitrary variable voltage not higher than the discharge voltage of the discharge tube 14, 17 is an a.c. voltage source with a voltage not lower than the discharge voltage of the discharge tube 14. These voltage sources 16 and 17 are connected in series with a series circuit of the resistor 13, the discharge tube 14, and the capacitor 15. When the voltage source 16 presents a variable voltage, the frequency of the a.c. voltage source 17 is selected to be sufficiently higher than the variation frequency (for example, more than ten times), so that the reactance of the capacitor 15 is negligible compared to the value of resistor 13 (for example, less then 1/100). The resistor 13 and the capacitor 15 are selected in accordance with a desired charging characteristic. 18 is an insulated gate type FET whose gate voltage is given by the charging voltage of capacitor 15 and whose drain is given a suitable d.c. voltage $V_D$. Numeral 19 is a source resistor connected to the source of FET 18. An output voltage is taken across source resistor 19. The output voltage may be also taken from the drain side of FET 18.

Figure 3:
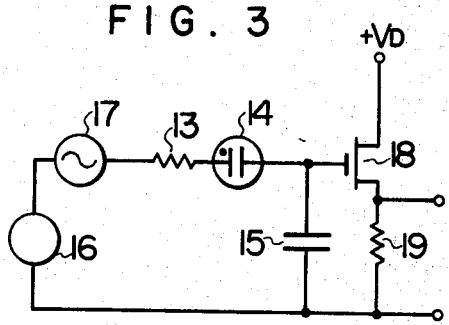
FIG. 3 is an electric circuit diagram of an electric charge holding device according to one embodiment of this invention.
Figure 4:
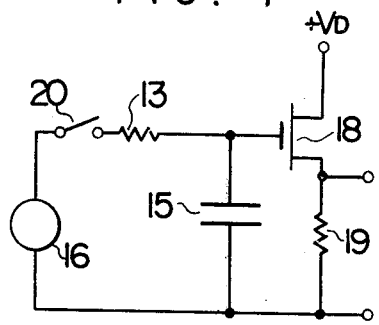
FIG. 4 is an equivalent circuit diagram of FIG. 3.

In the circuit of FIG. 3, no component of the a.c. voltage source 17 appears at either end of capacitor 15, so that the circuit of FIG. 3 may be considered to be equivalent to that of FIG. 4. Therefore, for the case of charging by a d.c. voltage, it is not necessary consider the fluctuations in the discharge voltage of the discharge tube and the absolute values of the positive and negative voltages set above this discharge voltage thereby enhancing the reliability of the circuit. The charging may be performed also by a variable voltage. Since the voltage of the voltage source 16 is not higher than the discharge voltage of discharge tube 14, switching switch 20 ON and OFF in FIG. 4 is considered equivalent to the ON - OFF switching of the a.c. voltage source 17 in FIG. 3.

Figure 5:
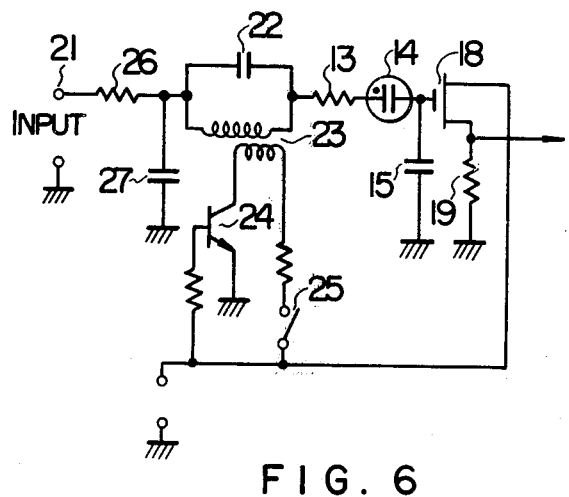
FIG. 5 is an electric circuit diagram showing a concrete arrangement of FIG. 3.

FIG. 5 shows a concrete example of the inventive circuit, in which a charging voltage source is applied to the input terminal 21. The transistor 24 serves as an oscillator which is turned on and off by a switch 25. Numeral 26 is a resistor and 27 is a bypass capacitor. Another embodiment of this invention will be next explained with reference to FIG. 6, in which reference numerals 13, 14, 15, 18 and 19 are used to denote like parts as shown in FIGS. 3, 4 and 5. 28 is a square wave voltage source whose waveform is as shown in FIG. 7. The ratio D of the pulse width to the period is variable and the amplitude is constant. Numeral 29 is a high frequency transformer whose secondary widing 30 forms a closed circuit with a series circuit of the resistor 13, the discharge tube 14, the capacitor 15 and the square wave voltage source 28. A high frequency voltage source 33 is connected to the primary winding 31 of the transformer 29 by way of a switch 32. The voltage of this high frequency voltage source 33 is chosen in such a manner that a voltage higher than the discharge voltage of discharge tube 14 appears on the secondary winding 30. The frequency is so chosen that the reactance of capacitor 15 is sufficiently smaller than the value of resistor 13. Numeral 34 is a drain terminal, and 35 and 36 are output terminals.

Now, consider that the square wave voltage source 28 has zero voltage across its terminals. When the switch 32 is turned on, the discharge tube 14 becomes conductive and an a.c. current flows through the circuit. At this time, the a.c. voltage appearing at both ends of capacitor 15 is negligible, because the reactance is much smaller than the value of resistor 13. Next, when the power source 28 begins to generate square waves, a current in the form of a sinusoidal wave superimposed on the square wave flows and the capacitor 15 is charged. In this state, when switch 32 is turned off, no voltage is generated across the secondary winding 30 of transformer 29. Since the amplitude $E_p$ of the voltage source 28 is less than the discharge voltage of discharge tube 14, the circuit current is zero and the voltage across the capacitor 15 is maintained.

Figure 6:
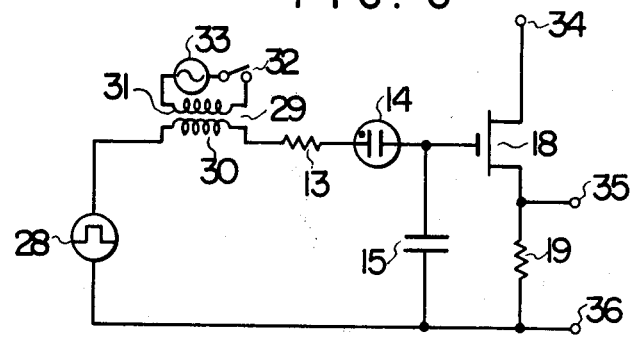
FIG. 6 is an electric circuit diagram of an electric charge holding device according to another embodiment of this invention.
Figure 7:
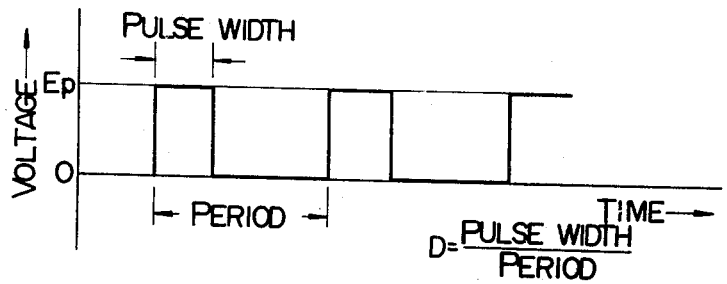
FIG. 7 shows voltage waveforms of a square wave power source employed in the circuit of FIG. 6.
Figure 8:
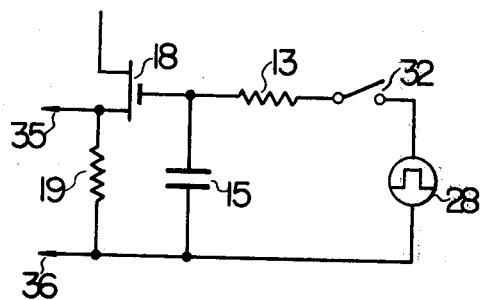
FIG. 8 is an equivalent circuit diagram of FIG. 6.
Figure 9:
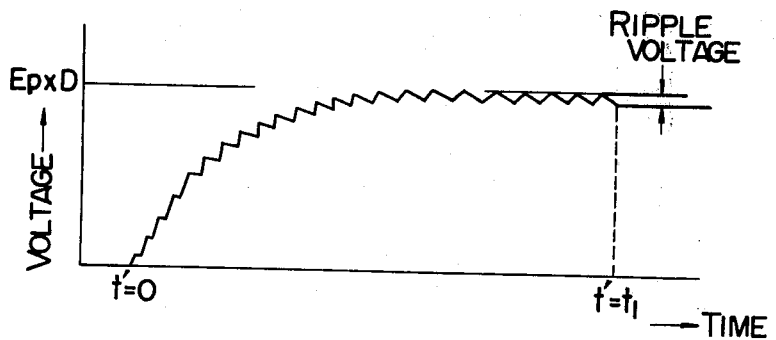
FIG. 9 shows the charging characteristic of the capacitor in the device of FIG. 6.

Here, the circuit shown in FIG. 6 is considered to be equivalent to a circuit shown in FIG. 8. Therefore, explanation will be made hereinafter of this equivalent circuit. We assume first that the ratio of the pulse width to the period of the voltage source 28 varies from 0 to 1. A change of pulse width with the period kept constant or a change of period with the pulse width held constant or both changes are allowed. Now, when the switch 32 is closed, the charging begins and the voltage across the capacitor 15 changes as shown in FIG. 9. We assume that the ratio of pulse width to period is D and that the switch 32 is closed at a time $t' = 0$. The rising characteristic of the voltage is determined by the time constant given by the product of the values of resistor 13 and capacitor 15. The ripple voltage is about 1 percent or 10 percent, when the ratio of the rest (quiescent) time in one period to the time constant is 1/100 or 1/10 respectively. In the normal state, the voltage shown in FIG. 9 becomes equal to the product of the amplitude of square wave voltage $E_p$ and the ratio D. Next, at a time $t' = t_1$, when the switch 32 is turned off, the voltage at this time is maintained. Thus, the voltage across the capacitor 15 in the normal state can be arbitrarily varied by changing the ratio D of the pulse width to the period. If the time constant given by the resistor 13 and the capacitor 15 is sufficiently smaller than the time of variation of the ratio D, the voltage across the capacitor 15 can follow the variation of D. The voltage across the capacitor 15 is detected by the gate of insulated gate type FET 18, and a voltage proportional to the gate voltage is taken out from the output terminals 35 and 36. But, the output voltage may be taken out from the drain side of transistor 18.

What we claim is:

1. An electric charge holding device comprising a capacitor, a resistor and a discharge tube connected in series; means for superimposing upon said series circuit an arbitrary voltage having a d.c. component for charging said capacitor; means for superimposing upon said series circuit an alternating voltage for driving said discharge tube into its conductive state, said arbitrary voltage having a magnitude not greater than the discharge voltage of said discharge tube and said alternating voltage having an amplitude not less than said discharge voltage; and output means coupled across said capacitor for providing an output voltage.

2. An electric charge holding device according to claim 1, wherein said arbitrary voltage is a direct voltage having a magnitude not greater than the discharge voltage of said discharge tube.

3. An electric charge holding device according to claim 1, wherein said output means is an insulated gate type field effect transistor having its gate electrode coupled to one end of said capacitor and its source electrode coupled to the other end of said capacitor, said output voltage being obtained between said source electrode and the other end of said capacitor.

4. An electric charge holding device according to claim 1, wherein said output voltage is obtained between said drain electrode and the other end of said capacitor.

5. An electric charge holding device according to claim 1, wherein said arbitrary voltage has a repetitive varying magnitude and wherein the frequency of said alternating voltage is at least an order of magnitude higher than the repetition period of said arbitrary voltage, whereby the reactance of said capacitor is made negligible compared to the resistance of said resistor.

6. An electric charge holding device according to claim 1, wherein the magnitude of the d.c. component of said arbitrary voltage is variable.

7. An electric charge holding device according to claim 6, wherein said arbitrary voltage is a square wave voltage and wherein the ratio of the pulse width of said square wave to the period of said wave is variable.

* * * * *